United States Patent [19]

O'Hara et al.

[11] 4,309,277

[45] Jan. 5, 1982

[54] CONVERSION OF HYDROCARBONS WITH A CATALYST COMPRISING AN ALUMINA-ZEOLITE, A GROUP VI-B METALLIC COMPONENT AND A GROUP VIII METALLIC COMPONENT

[75] Inventors: Mark J. O'Hara, Mt. Prospect; Russell W. Johnson, Hoffman Estates, both of Ill.

[73] Assignee: UOP Inc., Des Plaines, Ill.

[21] Appl. No.: 179,319

[22] Filed: Aug. 18, 1980

Related U.S. Application Data

[62] Division of Ser. No. 36,121, May 4, 1979, abandoned.

[51] Int. Cl.$^3$ .............................................. C10G 47/20
[52] U.S. Cl. .................................... 208/111; 208/120; 252/455 Z
[58] Field of Search ............................... 208/111, 120; 252/455 Z

[56] References Cited

U.S. PATENT DOCUMENTS

| | | | |
|---|---|---|---|
| Re. 22,196 | 10/1942 | Heard | 208/122 |
| 2,258,099 | 10/1941 | Patrick, Jr. | 423/626 |
| 2,274,634 | 3/1942 | Heard | 208/136 |
| 2,636,865 | 4/1953 | Kimberlin, Jr. et al. | 252/463 |
| 2,762,782 | 9/1956 | Kimberlin, Jr. et al. | 252/463 |
| 2,762,783 | 9/1956 | Kimberlin, Jr. et al. | 252/463 |
| 2,892,858 | 6/1959 | Ziegler | 260/448 |
| 2,905,632 | 9/1959 | Gladrow et al. | 208/136 |
| 3,006,864 | 10/1961 | Buchmann | 252/463 |
| 3,173,854 | 3/1965 | Eastwood et al. | 208/111 |
| 3,280,041 | 10/1966 | Michael | 252/466 |
| 3,507,812 | 4/1970 | Smith et al. | 252/438 X |
| 3,562,148 | 2/1971 | Mitsche | 208/139 |
| 4,172,813 | 10/1979 | Feinstein et al. | 208/111 X |
| 4,179,357 | 12/1979 | O'Hara et al. | 208/111 |

*Primary Examiner*—Delbert E. Gantz
*Assistant Examiner*—G. E. Schmitkons
*Attorney, Agent, or Firm*—James R. Hoatson, Jr.; John G. Cutts, Jr.; William H. Page, II

[57] ABSTRACT

Hydrocarbons are converted with a catalyst comprising an alumina-zeolite support, a Group VIII metallic component and a Group VI-B metallic component. Key features of the process are the commingling of alumina and zeolite before the rare earth exchange of the faujasite and the extremely low sodium concentration of the finished catalyst.

14 Claims, No Drawings

CONVERSION OF HYDROCARBONS WITH A CATALYST COMPRISING AN ALUMINA-ZEOLITE, A GROUP VI-B METALLIC COMPONENT AND A GROUP VIII METALLIC COMPONENT

CROSS-REFERENCE TO RELATED APPLICATION

This application is a division of our co-pending application Ser. No. 36,121, filed on May 4, 1979, now abandoned.

BACKGROUND OF THE INVENTION

Solid catalysts having a propensity to accelerate hydrorefining and hydrocracking reactions are widely used today in many industries within the petroleum and chemical arts to accelerate a wide spectrum of hydrocarbon conversion reactions. In many applications these solid catalysts are used by themselves to accelerate reactions such as catalytic cracking, alkylation, dealkylation, polymerization, etc. In other applications these catalysts are combined with a hydrogenation-dehydrogenation metallic component to form a dual-function catalyst having both a hydrocracking function and a hydrogenation-dehydrogenation function. In this latter case, the cracking function is generally thought to be associated with a material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

Heretofore the hydrocracking function has been typically provided by a wide variety of material such as zeolites, i.e., crystalline aluminosilicates, alumina, silica-alumina, silica-magnesia, silica gels, phosphates, various types of amorphous clays, acid-treated alumina, and halogen-containing alumina.

DETAILED DESCRIPTION OF THE INVENTION

The subject of the present invention is a novel catalytic composite which has an exceptional activity when employed in hydrocarbon conversion processes that require a catalyst having a hydrorefining and hydrocracking capability. More particularly, the present invention relates to a novel catalyst composite containing alumina, zeolite and at least one metal selected from Group VI-B and Group VIII. This catalyst is characterized by its method of preparation inasmuch as it is an essential feature of the present invention that the catalyst support comprising alumina and a sodium form zeolite is formulated before the sodium level of zeolite is reduced via a series of ion exchanges and calcinations. The catalyst so produced finds utility in the acceleration of hydrocarbon conversion reactions that respond to hydrorefining and hydrocracking catalysts. The catalyst prepared according to the present invention is particularly well suited for the production of jet fuel and gasoline.

The thrust of the present invention is grounded in the finding that if the alumina-zeolite and at least one metal component selected from the Group VI-B or Group VIII is prepared in a particular manner, a superior catalyst results. In other words, we have found a method for combining the above-mentioned components to produce a catalyst having a hydrocracking function which is substantially greater than catalysts containing the same elementary components and prepared by different techniques.

In one embodiment, the present invention provides a method of preparing a hydrocarbon conversion catalyst comprising a zeolite-alumina support containing at least one metallic component selected from Group VI-B and at least one metallic component selected from Group VIII. The method comprises the steps of (a) extruding alumina and a sodium form zeolite; (b) calcining the resulting extrudate; (c) contacting the resulting calcined extrudate with a sodium ion exchange solution to reduce the sodium concentration of said extrudate; (d) contacting the resulting extrudate from step (c) with a rare earth salt solution; (e) calcining the resulting extrudate from step (d); (f) contacting the resulting calcined extrudate from step (e) with a sodium ion exchange solution to further reduce the sodium concentration of said extrudate to less than about 0.5 wt. %; and (g) incorporating at least one metal component selected from Group VI-B and at least one metal component selected from Group VIII on the resulting extrudate from step (f).

Another embodiment relates to a hydrocarbon conversion catalyst described in the previous embodiment wherein the extrudate contains from about one percent to about ninety percent zeolite, the Group VI-B metallic component is tungsten or a compound thereof and the Group VIII metallic component is nickel or a compound thereof.

Yet another embodiment is a process for the conversion of hydrocarbon which comprises contacting the hydrocarbon and hydrogen with the catalytic composite of the first embodiment at hydrocarbon conversion conditions.

Other objects and embodiments of the present invention relate to the details regarding the precise nature of the steps utilized in forming the catalyst, the preferred catalytic ingredients, the concentration of components in the catalyst, operating conditions for use in the hydrocarbon conversion processes, and the like particulars which are hereinafter given in the following discussion of each of the facets of the present invention.

The zeolite-alumina is an essential element of the catalyst of the present invention and is preferably a composite of fajuasite and alumina. By way of specific examples, a satisfactory support or carrier material may comprise a 50/50 mixture of faujasite and alumina. In general, the support comprises from about one weight percent to about ninety weight percent faujasite.

The support material for the catalyst of the invention is coextruded zeolite and alumina. The catalyst may exist in any convenient form and be disposed as a fixed bed within a reaction zone. The hydrocarbon feedstock may be passed therethrough in the liquid, vapor or mixed phase, and in either upward or downward flow. Alternatively, the catalyst may be prepared in a suitable form for use in moving bed reaction zones, in which the hydrocarbon feedstock and catalyst are passed either in countercurrent flow or in co-current flow; or in fluidized-solid processes in which the feedstock is passed upward through a turbulent bed of finely divided catalyst; or in the suspensoid process, in which the catalyst is slurried in the feedstock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

Suitable sodium ion exchange solutions are those which perform the function of reducing the level of sodium ions in the zeolite. Aqueous solutions of ammonium salts may be used to ion exchange the zeolite's indigenous sodium ions. A preferred sodium ion exchange solution comprises ammonium nitrate and ammonium hydroxide.

A Group VIII metallic component and a Group VI-B metallic component are essential components of the catalyst of the present invention. Thus, the catalytic composite may contain metallic components from the group of molybdenum, tungsten, chromium, iron, cobalt, nickel, platinum, palladium, iridium, osmium, rhodium, ruthenium, and mixtures thereof. The concentration of the catalytically active metallic components is primarily dependent upon the particular metals as well as the physical and chemical characteristics of the charge stock. For example, the metallic components from Group VI-B, i.e., molybdenum, tungsten and chromium, are preferably present in an amount within the range of from about 0.01 percent to about 20 percent by weight, the iron-group metals in an amount within the range of from about 0.01 percent to about 10 percent by weight, whereas the platinum-group metals are preferred to be present in an amount within the range of from about 0.01 percent to about 5 percent by weight, all of which are calculated as if the metallic component existed within the finished catalytic composite as the elemental metal. The zeolite-alumina carrier material may be combined with the catalytically active metallic components in any suitable manner such as ion exchange and/or impregnation with a suitable solution of the metallic components. Accordingly, the preferred method of preparing a dual-function catalyst comprising a metallic component combined with a zeolite-alumina support prepared by the method outlined above involves the utilization of water soluble compounds of the metallic component to impregnate the support material.

Any suitable alumina may be employed in the present invention. A frequently preferred alumina for use in hydrocarbon conversion catalyst is gamma-alumina. Although there are various methods of preparing the alumina hydrate from which the gamma-alumina can in turn be prepared, most frequently the hydrated alumina is formed by making an alumina gel. The name "gel" is applied to preparations of alumina which are amorphous, or chiefly amorphous, hydrated forms obtained by starting from solutions of aluminum salts or of alkaline aluminates.

"Sol" is usually the term applied to liquid colloidal solutions which upon partial dehydration become solid gels.

U.S. Pat. No. 3,280,041 mentions two general methods of preparing hydrated alumina. One method is referred to as "precipitated aluminas" by which is meant the aluminas formed by the addition of an acid or acid salt such as sulfuric acid, hydrochloric acid or any of the alums (aluminum sulfate containing a varying number of moles of water of hydration) to an alkali metal aluminate such as sodium or potassium aluminate.

Another type of hydrated alumina is referred to as the "Heard-type alumina sol," by which is meant the alumina sols prepared by the digestion of metallic aluminum by the action of acetic or equivalent acid in the presence of mercury of other amalgamating agents. Such sols and their methods of preparation are described in U.S. Pat. No. 2,258,099 and in U.S. Pat. No. Re. 22,196 of U.S. Pat. No. 2,274,634.

Still another method of making alumina is by dissolving aluminum in an alcohol to form an aluminum alcoholate or an aluminum alkoxide, followed by hydrolyzing the aluminum alkoxide to form an alcohol and an aluminum hydroxide or hydrated alumina paste. Water is removed from the aluminum hydroxide to obtain alumina. To aid in dissolving the chunks of aluminum metal or aluminum turnings in the alcohol, a small amount of mercuric chloride is generally used. This method in general is an old method, but improvements relating to it are described in U.S. Pat. Nos. 2,636,865; 2,762,782; 2,762,783; 2,905,632; and 3,006,864.

Parenthetically, it can be mentioned that the alumina produced in accordance with the previously cited patents covers a cited range of surface areas and wide range of calcination temperatures, specifically from 356 meters squared per gram surface area to about 170 meters squared per gram, and calcination temperatures from about 850° F. to about 1200° F.

Additionally, the alumina may be produced by a method involving reacting aluminum with an alcohol to form an aluminum alkoxide. The alumina is a byproduct from Ziegler higher alcohol synthesis reactions. Ziegler alcohol synthesis reactions are described, for example, in Karl Ziegler's U.S. Pat. No. 2,892,858. The Ziegler reaction byproduct aluminas are also described in a Conoco Bulletin of Jan. 19, 1971, on "Catapal Aluminas." This bulletin described Catapal alumina SB as having a surface area of 250 square meters per gram and Catapal N as haviung 180 square meters per gram. In the present invention, the preferred type of alumina is Ziegler alumina.

Regardless of the details of how the metallic component of the catalyst is combined with the catalyst, the resulting dual-function catalyst generally will be dried at a temperature of from about 200° F. to about 600° F. for a period of from about 2 to 24 hours or more and finally calcined at a temperature of about 700° F. to about 1300° F. for a period of about 0.5 to about 10 hours, and preferably 1 to about 5 hours.

Although it is not essential, the resultant reduced dual-function catalyst is preferably subjected to a presulfiding operation designed to incorporate in the catalytic composite from about 0.05 to about 1.5 wt. % sulfur calculated on an elemental basis. The sulfur content of the resulting sulfided catalyst is proportional to the metal content even though the metals may not necessarily be completely sulfided. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50° F. to about 1100° F. or more.

The conditions utilized in the hydrocarbon conversion embodiments of the present invention are those customarily used in the art for the particular reaction or combination of reactions, that is to be effected. For instance, typical hydrocracking conditions include: a pressure of about 400 psig to 3000 psig, a temperature of about 400° F. to about 900° F., a LHSV of about 0.1 hr.$^{-1}$ to about 10 hr.$^{-1}$, and hydrogen circulation rates of about 1000 to about 15,000 SCFB of charge stock.

Although the method of preparing the catalyst and careful selection of operating conditions within the ranges hereinbefore set forth, extend the effective life of the catalyst composite, regeneration thereof may eventually become desired due to the natural deterioration of the catalytically active metallic components. The catalytic composite is readily regenerated by treating the same in an oxidizing atmosphere, at a temperature of from about 750° to about 850° F., and burning coke and other heavy hydrocarbonaceous material therefrom. If desirable, the catalyst may then be sulfided in the sme manner as fresh catalyst as hereinbefore described.

The following examples are given to illustrate further the preparation of the catalystic composite of the present invention and the use thereof in the conversion of hydrocarbons. It is understood that the examples are given for the sole purpose of illustration and are not to be considered to undulylimit the generally broad scope and spirit of the appended claims.

EXAMPLE I

The catalyst of this exmaple is prepared according to the method of the present invention. Five hundred and thirty grams of alumina powder and 510 grams of sodium form faujasite (Linde SK-40 powder) were admixed with 630 ml of water and 32 ml of nitric acid to form a dough which was extruded through a 1/16" diameter die plate. The resulting extrudate was dried for about two hours at 100° C. and then reduced to particles having a length to diameter ratio of about 3. The extrudates were then calcined for one hour at 1100° F. Five gallons of water containing 50 grams of ammonium nitrate and 25 cc of ammonium hydroxide were passed upflow over 1000 cc of the calined catalyst support at 95° C. for 16 hours. The extrudates were then washed with deionized water and then exchanged with an 800 cc rare earth chloride solution containing 8.8 grams neodymium (Nd), 4.3 grams praseodymiun (Pr), 37.8 grams cerium (Ce) and 20.7 grams lanthanum (La) at 200° F. for 1 hour. The resulting exchanged extrudates were then washed with water until chloride-free, dried at 100° C. and calcined for one hour at 500° C. The extrudates were then exchanged again with ammonium nitrate as in the first hereinabove described exchange, dried and calcined at 500° C. The resulting extrudates contained 0.02 weight percent sodium 0.1 weight percent Nd, 0.4 weight percent Pr, 3.3 weight percent Ce and 2.0 weight percent La.

One hundred twenty-two cc (73.1 g) of the resulting support was immersed in an 84 cc solution containing 2.9 grams of nickel nitrate and 8.05 grams of ammonium metatungstate. After ½ hour, the impregnated support was removed from the solution. Sixty-one cc of the solution has been absorbed on the suport. The impregnated support was dried for one hour at 100° C. and calcined at 1100° F. for one hour. On the basis of absorbed metals, the catalyst contained 0.57 weight percent nickel and 5.73 weight percent tungsten.

A portion of the above-mentioned catalyst was subjected to an evaluation test which consists of charging a vacuum gas oil having the properties shown in Table I to a hydrocracking catalytic reaction zone containing said catalyst at conditions including a liquid hourly space velocity (LHSV) of 0.99, a hydrogen circulation rate of 12,000 SCFB, a pressure of 2000 psig and a reactor bath temperature of 710° F.

TABLE I

| Properties of Vacuum Gas Oil | |
|---|---|
| API° Gravity at 60° F. | 21.6 |
| ASTM Distillation D-158, IBP, °F. | 441 |
| 10% | 619 |
| 50% | 758 |
| 90% | 886 |
| 95% | 921 |
| EPB, °F. | 959 |
| Total Sulfur, Weight % | 3.0 |
| Total Nitrogen, Weight % | 0.12 |

The reactor effluent was separated to yield a normally gaseous stream, rich in hydrogen and a normally liquid stream. The latter stream was fractionated to determine the percentage of the liquid stream which boils at a temperature less than 650° F. or 650° -minus fraction. On a once through basis, the 650° -minus fraction was 91.2 liquid volue percent. This example demonstrates the catalytic ability of an excellent hydrocracking catalyst prepared according to the method of the present invention. See Table II for further details.

TABLE 2

| | Hydrocracking Test Summary | | | | | | |
|---|---|---|---|---|---|---|---|
| Catalyst | Total Rare Earth Metals, Wt. % | Sodium Content, Wt. % | Apparent Bulk Density, g/cc | LHSV | Reactor Salt Bath Temp.,°F. | Liquid Product Gravity°API | 650° F.-Minus |
| Example I 50/50 Alumina-Faujasite 0.57% Ni/5.73% W | 6.6 | 0.02 | 0.681 | 0.994 | 710 | 47.4 | 91.2 |
| Example II 50/50 Alumina-Faujasite 0.515% Ni/5.11% W | 4.8 | 0.3 | 0.715 | 0.958 | 710 | 25.9 | 10.0 |
| Example III 50/50 Alumina-Faujasite 0.53% Ni/5.23% W | 4.6 | 0.05 | 0.657 | 0.996 | 709 | 34.7 | 55.5 |

EXAMPLE II

Fourteen hundred grams of sodium form faujasite (Linde SK-40 powder) were stirred with seven liters of water containing 20.5 g of Nd, 9.94 g of Pr, 87.8 g of Ce and 48. 1 g of La as rare earth chloride and 225 g of ammonium chloride for 1.5 hours at 60° C. The resulting powder was filtered, recovered and washed free of chloride. The powder contained 1.4 weight percent Ce, 3.0 weight percent La, and 3.6 weight percent sodium. A reduction to 0.93 weight percent sodium was achieved after four washes with a 10% ammonium nitrate solution at 95° C. Four additional washes with fresh ammonium nitrate solution decrease the sodium content to 0.57 weight percent. The powder was then washed with twenty liters of water, dried and calcined for one hour at 500° C. One hundred and five grams of the exchanged faujasite was mixed with 135 g of Catapal alumina, 150 ml of water and 8 ml of nitric acid and extruded through a 1/16" diameter die plate. The resulting extrudate was dried and calcined for one hour at 1100° F.

Eighty and a half grams of the resulting support were immersed in a 100 ml solution containing 3.2 g of nickel nitrate and 8.8 g of ammonium metatungstate for 30 minutes and 69 cc of the solution was adsorbed. The impregnated support was dried for one hour at 100° C. and calcined at 1100° F. for one hour. On the basis of adsorbed metals, the catalyst contained 0.515 weight percent nickel and 5.11 weight percent tungsten.

A portion of the above-mentioned catalyst was subjected to a test which was identical to the test in Example I including a liquid hourly space velocity (LHSV) of 0.958, a hydrogen circulation rate of 12,000 SCFB, a pressure of 2000 psig and a reactor bath temperature of 710° F. The resulting normally liquid hydrocarbon stream was fractionated to determine the percentage of the liquid stream which boils at a temperature less than 650° F. or 650°-minus fraction. On a once-through basis, the 650°-minus fraction was 10.0 liquid volume percent. This example demonstrates very poor catalyst activity of a 50/50 alumina-faujasite rare earth exchanged catalyst containing 0.5 weight percent nickel and 5.2 weight percent tungsten. Although the catalysts prepared in both Example I and II were subjected to equal rare earth metal exchange, the catalyst of Example I contained 6.6% total rare earth metal content while the catalyst of Example II only managed to assimulate 4.8% total rare earth metals. The increase in catalyst activity noted by admixing the sodium form of the faujasite and alumina over the pre-rare earth exchanged form of the faujasite and alumina would not be expected unless the exchange cation affects the reaction of the faujasite with alumina. See Table II for further details.

EXAMPLE III

Twenty-six hundred and seventy-one grams of sodium form faujasite (Linde SK-40 powder) were stirred in four liters of 10% ammonium nitrate solution for two hours at 95° C. The treated powder was filtered and reslurried in four liters of water and once again filtered and dried for 16 hours at 100° C. The powder was reslurried five more times in 4 liters of 10% ammonium nitrate solution which included 10 cc of ammonium hydroxide at 95° C. with filtering between slurries. The resulting powder was then reslurried in 4 liters of water and dried for 16 hours at 100° C. The powder contained 2.76 weight percent sodium on a volatile free basis. A batch of 1110 grams of the oven dried powder (866 grams on a calcined basis) was slurried in 3 liters of water containing 8.0 grams of Nd, 4.4 grams of Pr, 38.6 grams of Ce, and 21.1 grams of La as rare earth chlorides for one hour at 60° C. and then for one hour at 75° C. The rare earth metal exchange was completely analogous to Examples I and II except for assimulation. The resulting powder was filtered and water washed until chloride free. The powder was oven dried and calcined for one hour at 500° C. After calcination, the powder was stirred eight times in four liters of water which contained 10% ammonium nitrate and 5 cc of ammonium hydroxide at 95° C. and then two times with 9 liters of water. The resulting filtered powder was dried and calcined at 500° C. for one hour. The calcined powder contained 0.11 weight percent sodium, 1.25 weight percent Nd, 0.5 weight percent Pr, 4.5 weight percent Ce and 2.84 weight percent La.

One hundred grams on a calcined basis of the hereinabove pretreated faujasite and 135 grams of Catapal alumina (100 grams of alumina) were mixed, extruded, dried and calcined in the same manner as the extrudate produced in Example II.

A batch of 73.1 grams of the finished support was immersed in 84 cc of the solution containing 2.9 grams of nickel nitrate and 8.05 grams of ammonium metatungstate for 30 minutes. Sixty cc of the solution was absorbed. The wet support containing nickel and tungsten was dried and oxidized as in Examples I and II. On the basis of absorbed metals, the finished catalysts contained 0.53 weight percent nickel and 5.23 weight percent tungsten.

A portion of the above-mentioned catalyst was subjected to a test which was identical to the tests in Examles I and II including a liquid hourly space velocity (LHSV) of 0.958, a hydrogen circulation rate of 12,000 SCFB, a pressure of 2000 psig and a reactor bath temperature of 710° F. The resulting normally liquid hydrocarbon stream was fractioned to determine the percentage of the liquid stream which boils at a temperature less than 650° F. or 650°-minus fraction. On a once through basis, the 650°-minus fraction was 55.5 iquid volume percent. See Table II for further details.

The foregoing specification, and particularly the examples, indicate the method by which the present invention is effected, and the benefits afforded through the utilization thereof.

We claim as our invention:

1. A process for the conversion of a hydrocarbon at hydrocarbon conversion conditions which comprises contacting said hydrocarbon with a catalyst prepared by a method comprising:
   (a) extruding alumina and a sodium form zeolite;
   (b) calcining the resulting extrudate;
   (c) contacting the resulting calcined extrudate with a sodium ion exchange solution to reduce the sodium concentration of said extrudate;
   (d) contacting the resulting extrudate from step c) with a rare earth salt solution;
   (e) calcining the resulting extrudate from step d);
   (f) contacting the resulting calcined extrudate from step e) with a sodium ion exchange solution to further reduce the sodium concentration of extrudate to less than about 0.5 wt. %; and
   (g) incorporating at least one metal component selected from Group VI-B and at least one metal component selected from Group VIII on the resulting extrudate from step f).

2. The process of claim 1 wherein said alumina is Ziegler alumina.

3. The process of claim 1 wherein said zeolite is faujasite.

4. The process of claim 1 wherein said calcining occurs at a temperature from about 700° F. to about 1300° F.

5. The process of claim 1 wherein said sodium concentration of the extrudate is less than about 0.1 wt. %.

6. The process of claim 1 wherein said Group VI-B metal component is tungsten.

7. The process of claim 1 wherein said Group VI-B metal component comprises from about 1 to about 20 wt. % of the finished catalyst based on the elemental metal.

8. The process of claim 1 wherein said Group VIII metal comprises from about 0.1 to about 5 wt. % of the finished catalyst based on the elemental metal.

9. The process of claim 1 wherein said Group VIII metal component is nickel.

10. The process of claim 1 wherein said hydrocarbon conversion conditions include a pressure of about 400 psig to about 3000 psig.

11. The process of claim 1 wherein said hydrocarbon conversion conditions include a temperature of about 400° F. to about 900° F.

12. The process of claim 1 wherein said hydrocarbon conversion conditions include a liquid hourly space velocity of about 0.1 hr.$^{-1}$ to about 10 hr.$^{-1}$.

13. The process of claim 1 wherein said hydrocarbon conversion conditions include a hydrogen circulation rate of about 1000 to about 15,000 SCFB of charge stock.

14. A process for the hydrocracking of a hydrocarbon oil comprising contacting the hydrocarbon oil under hydrocracking conditions at an elevated temperature and pressure with a hydrocracking catalyst prepared by a method comprising:
 (a) extruding alumina and a sodium form zeolite;
 (b) calcining the resulting extrudate;
 (c) contacting the resulting calcined extrudate with a sodium ion exchange solution to reduce the sodium concentration of said extrudate;
 (d) contacting the resulting extrudate from step (c) with a rare earth salt solution;
 (e) calcining the resulting extrudate from step (d);
 (f) contacting the resulting extrudate from step (e) with a sodium ion exchange solution to further reduce the sodium concentration of the extrudate to less than about 0.5 wt. %; and
 (g) incorporating at least one metal component selected from Group VI-B and at least one metal component selected from Group VIII on the resulting extrudate from step (f).

* * * * *